(12) United States Patent
Liu

(10) Patent No.: US 12,032,175 B2
(45) Date of Patent: Jul. 9, 2024

(54) IMAGING CORRECTION UNIT AND IMAGING MODULE

(71) Applicant: GUANGZHOU LUXVISIONS INNOVATION TECHNOLOGY LIMITED, Guangzhou (CN)

(72) Inventor: Chuan-Hui Liu, Guangzhou (CN)

(73) Assignee: GUANGZHOU LUXVISIONS INNOVATION TECHNOLOGY LIMITED, Guangzhou (CN)

( * ) Notice: Subject to any disclaimer, the term of this patent is extended or adjusted under 35 U.S.C. 154(b) by 498 days.

(21) Appl. No.: 17/493,860

(22) Filed: Oct. 5, 2021

(65) Prior Publication Data
US 2022/0137427 A1 May 5, 2022

(30) Foreign Application Priority Data

Nov. 3, 2020 (CN) .......................... 202011209434.4

(51) Int. Cl.
| | | |
|---|---|---|
| G02B 27/64 | (2006.01) |
| G02B 5/04 | (2006.01) |
| G02B 7/18 | (2021.01) |
| G02B 26/08 | (2006.01) |
| G03B 5/00 | (2021.01) |
| G02B 13/00 | (2006.01) |

(52) U.S. Cl.
CPC ............. G02B 27/646 (2013.01); G02B 5/04 (2013.01); G02B 7/1805 (2013.01); G02B 26/0891 (2013.01); G03B 5/00 (2013.01); *G02B 13/0065* (2013.01)

(58) Field of Classification Search
CPC ........ G02B 27/646; G02B 27/64; G02B 7/18; G02B 26/08; G02B 5/04; G02B 7/1805; G02B 26/0891; G02B 13/0065; G02B 3/02; G03B 5/00; H04N 5/235
See application file for complete search history.

(56) References Cited

U.S. PATENT DOCUMENTS

| | | | | |
|---|---|---|---|---|
| 6,038,089 A | * | 3/2000 | Maruyama ............ | G11B 7/1356 369/112.28 |
| 10,539,781 B2 | * | 1/2020 | Carothers ............ | G02B 26/0891 |
| 2007/0211343 A1 | * | 9/2007 | Clark .................... | G02B 5/04 359/577 |
| 2016/0216691 A1 | * | 7/2016 | Kim ...................... | G02B 26/108 |
| 2017/0160541 A1 | * | 6/2017 | Carothers ............. | G02B 17/08 |
| 2018/0038690 A1 | * | 2/2018 | Ohtomo ................ | H02K 7/085 |
| 2018/0284282 A1 | * | 10/2018 | Hong .................... | G01S 17/10 |
| 2020/0026058 A1 | * | 1/2020 | Maryfield ............ | G02B 26/0891 |
| 2021/0318592 A1 | * | 10/2021 | Kim ...................... | G02B 7/08 |

\* cited by examiner

*Primary Examiner* — Balram T Parbadia
*Assistant Examiner* — John Curtis Sipes
(74) *Attorney, Agent, or Firm* — JCIPRNET

(57) ABSTRACT

An imaging correction unit and an imaging module are provided. The imaging correction unit has an optical axis, and includes an optical turning element and two wedge-shaped optical elements. The optical turning element has a light emitting surface, and the light emitting surface has a first included angle with respect to the optical axis. Each of the two wedge-shaped optical elements has an inclined optical surface, and the inclined optical surface has a second included angle with respect to the optical axis. The light emitting surface of the optical turning element faces one of the two wedge-shaped optical elements, and the two wedge-shaped optical elements are rotatable relative to the optical axis.

20 Claims, 8 Drawing Sheets

IMAGING CORRECTION UNIT AND IMAGING MODULE

CROSS-REFERENCE TO RELATED APPLICATION

This application claims the priority benefit of China application no. 202011209434.4, filed on Nov. 3, 2020. The entirety of the above-mentioned patent application is hereby incorporated by reference herein and made a part of this specification.

BACKGROUND

Technical Field

The disclosure relates to an optical unit and an optical module, particularly to an imaging correction unit and an imaging module.

Description of Related Art

Currently, a camera shake correction function is generally realized by an optical method of physically adjusting an optical axis, and the optical camera shake correction function typically includes a lens moving type and a photographic element moving type.

In detail, in the lens moving type camera shake correction function, a dedicated drive mechanism is used in a part of or the whole of a lens group forming an image light of an imaged object, and the lens group is moved relative to a photographic element in a direction of eliminating camera shake, thereby correcting an optical axis and guiding the image light of the imaged object toward the photographic element. In this way, however, for the lens moving type camera shake correction function, it is necessary to design a drive mechanism that complies with the shape or optical specifications of a correction lens for the lens groups of each different type of camera.

On the other hand, in the photographic element moving type camera shake correction function, a photographic element is moved according to camera shake by a dedicated drive mechanism, so that the photographic element remains in a constant position relative to an optical axis of a lens group. However, for the photographic element moving type camera shake correction function, it is also necessary to design the dedicated drive mechanism according to different photographic elements of different types of cameras.

Therefore, there has been proposed a structure in which an optical unit for correction is installed on an optical axis of an optical lens. The optical unit includes a movable prism that refracts light incident on the optical lens, an actuator for driving the movable prism, and a power transmission mechanism that includes a shaft for transmitting the power of the actuator to the movable prism. Accordingly, there is no need to design the shape of the correction lens and the drive mechanism for each different type of camera, and the design can be simplified. However, in order to adjust the optical axis on a two-dimensional plane, it is usually necessary to dispose the actuator in every direction to correspond to the two dimensions.

SUMMARY

The disclosure provides an imaging correction unit and an imaging module that have small volume, low power consumption and high efficiency.

An imaging correction unit of the disclosure has an optical axis, and includes an optical element and two wedge-shaped optical elements. The optical element has a light emitting surface, and the light emitting surface has a first included angle with respect to the optical axis. Each of the two wedge-shaped optical elements has a minimum thickness dimension and a maximum thickness dimension respectively at a first edge and a second edge opposite the first edge. A line connecting the first edge and the second edge forms a symmetry axis of the each of the two wedge-shaped optical elements. The each of the two wedge-shaped optical elements has an inclined optical surface, and the inclined optical surface has a second included angle with respect to the optical axis. The light emitting surface of the optical element faces one of the two wedge-shaped optical elements. The two wedge-shaped optical elements are rotatable relative to the optical axis. The imaging correction unit satisfies the following relationship, $$|2n_p \times \theta_w \times \sin \theta_r| \geq |90 - \theta_p|,$$

in which $n_p$ is a refractive index of the optical element, $\theta_p$ is the first included angle, $\theta_w$ is the second included angle, and $\theta_r$ is half an angle of the symmetry axis of one of the two wedge-shaped optical elements with respect to the symmetry axis of the other of the two wedge-shaped optical elements.

An imaging module of the disclosure includes the aforementioned imaging correction unit and a lens unit. The imaging correction unit and the lens unit are arranged along the optical axis.

In an embodiment of the disclosure, the optical element is an optical turning element.

In an embodiment of the disclosure, the lens unit is configured to image a beam passing through the optical turning element and the two wedge-shaped optical elements in a predetermined imaging area of an imaging surface.

In an embodiment of the disclosure, the optical turning element is a prism and further has a light incident surface and a reflective optical surface. The reflective optical surface is connected to the light incident surface and the light emitting surface. The light incident surface is parallel to the optical axis. A beam incident on the optical turning element from the light incident surface is reflected by the reflective optical surface and then leaves the optical turning element via the light emitting surface. An included angle between the light emitting surface and the light incident surface is equal to the first included angle.

In an embodiment of the disclosure, a thickness dimension of the each of the two wedge-shaped optical elements gradually changes from the minimum thickness dimension to the maximum thickness dimension along the symmetry axis of the each of the two wedge-shaped optical elements.

In an embodiment of the disclosure, the each of the two wedge-shaped optical elements further has an outer surface and a circumferential end face. The outer surface and the inclined optical surface are opposite each other. An included angle between the circumferential end face at the second edge and the inclined optical surface is equal to the second included angle.

In an embodiment of the disclosure, rotation of the two wedge-shaped optical elements relative to the optical axis is controlled by the same actuator.

In an embodiment of the disclosure, the two wedge-shaped optical elements include a first wedge-shaped optical element and a second wedge-shaped optical element. The first wedge-shaped optical element and the second wedge-shaped optical element are rotated in opposite directions from each other relative to the optical axis.

Based on the above, by configuring the optical turning element, a traveling direction of an image light forming an imaged object can be changed. Thus, the imaging correction unit and the imaging module can be reduced in volume. Moreover, in the imaging correction unit and the imaging module, by configuring the two wedge-shaped optical elements that are rotatable relative to the optical axis, relative rotation angles of the two wedge-shaped optical elements can be controlled by the same actuator, thereby enabling an optical shake compensation function, thus achieving low power consumption and high efficiency. In addition, in the imaging correction unit and the imaging module, by configuring the optical turning element, an initial deviation of a beam passing through the wedge-shaped optical element can be corrected in advance, thus improving the optical shake compensation function of the imaging correction unit and the imaging module.

DESCRIPTION OF THE EMBODIMENTS

Figure 1A:
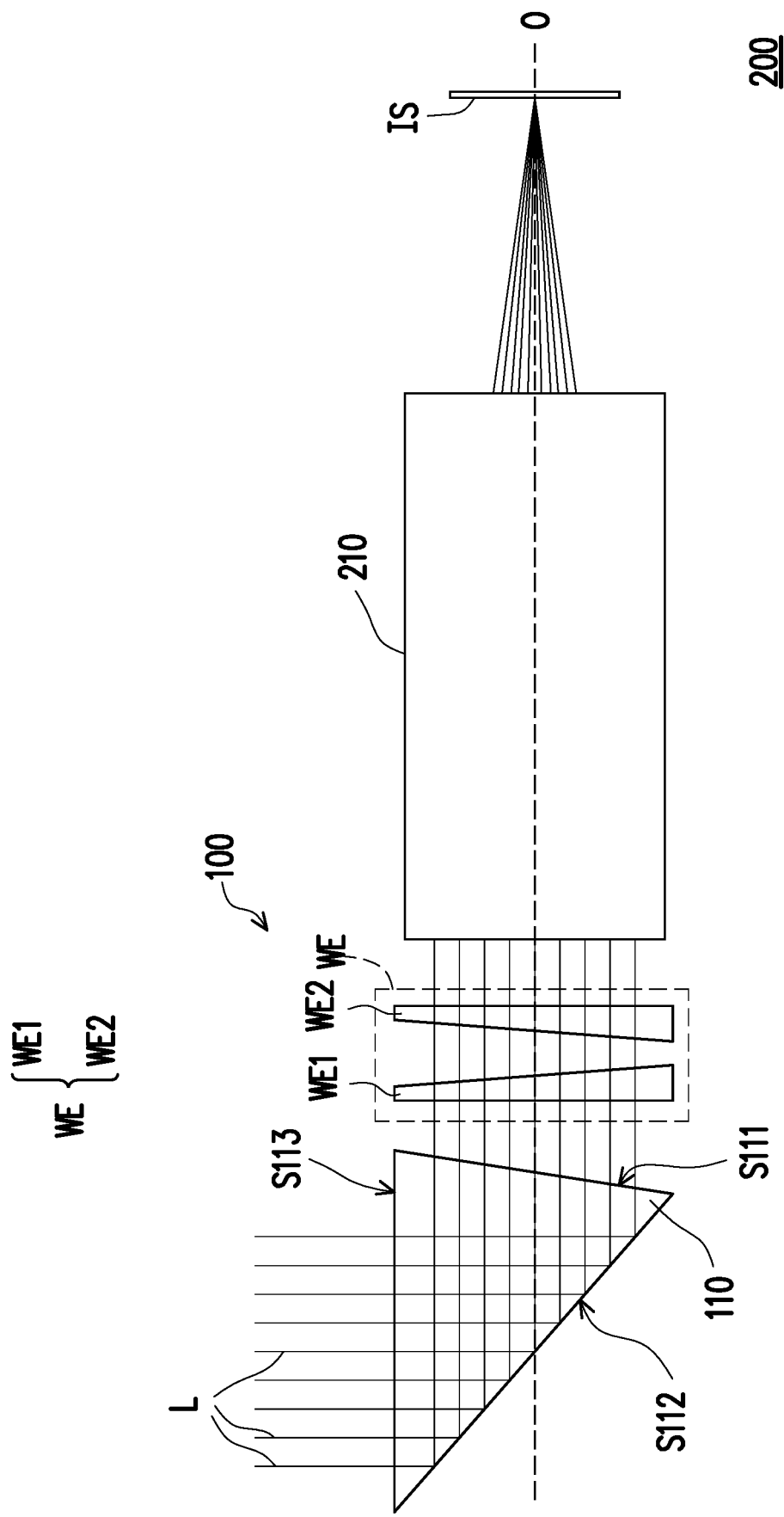
FIG. 1A is a schematic view of an imaging module according to an embodiment of the disclosure.
Figure 1B:
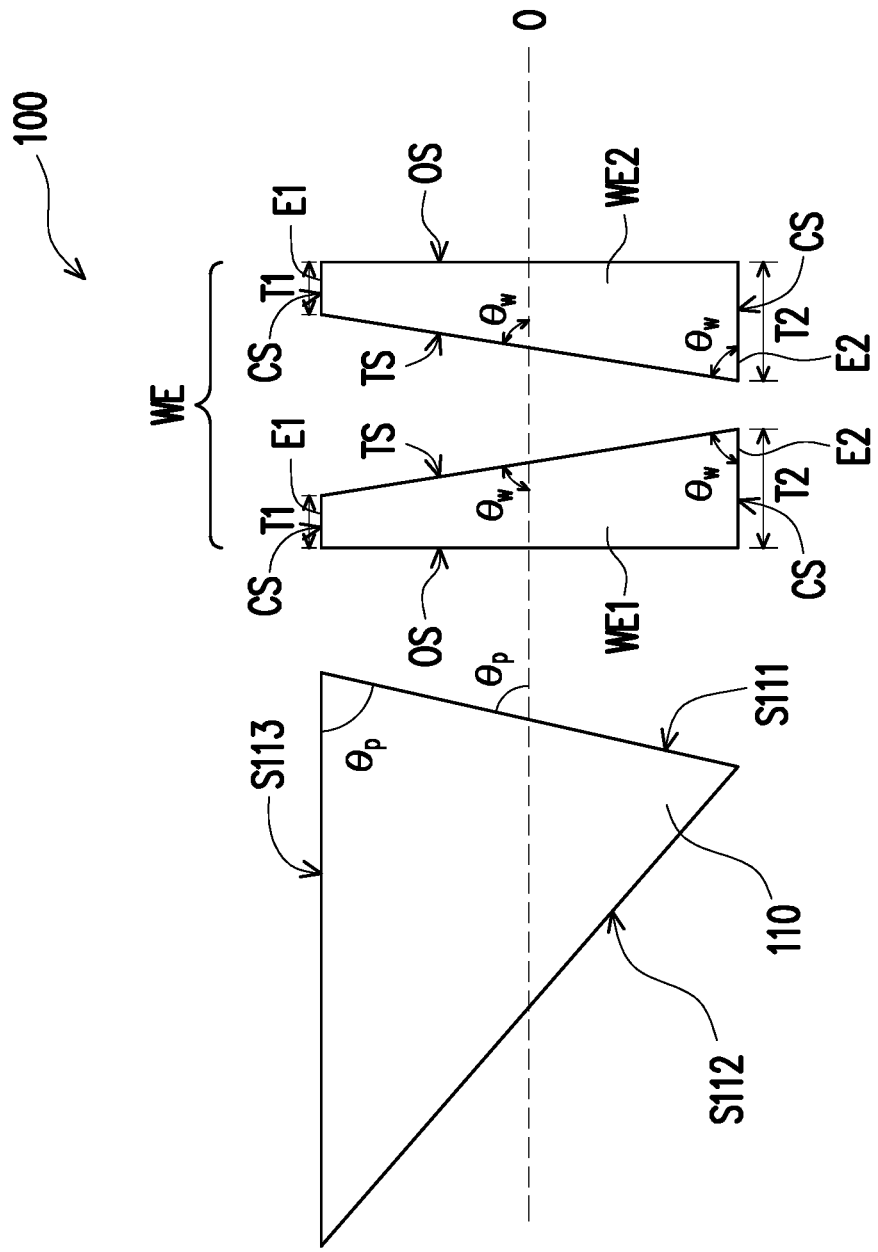
FIG. 1B is an enlarged schematic view of two wedge-shaped optical elements of FIG. 1A.
Figure 2:
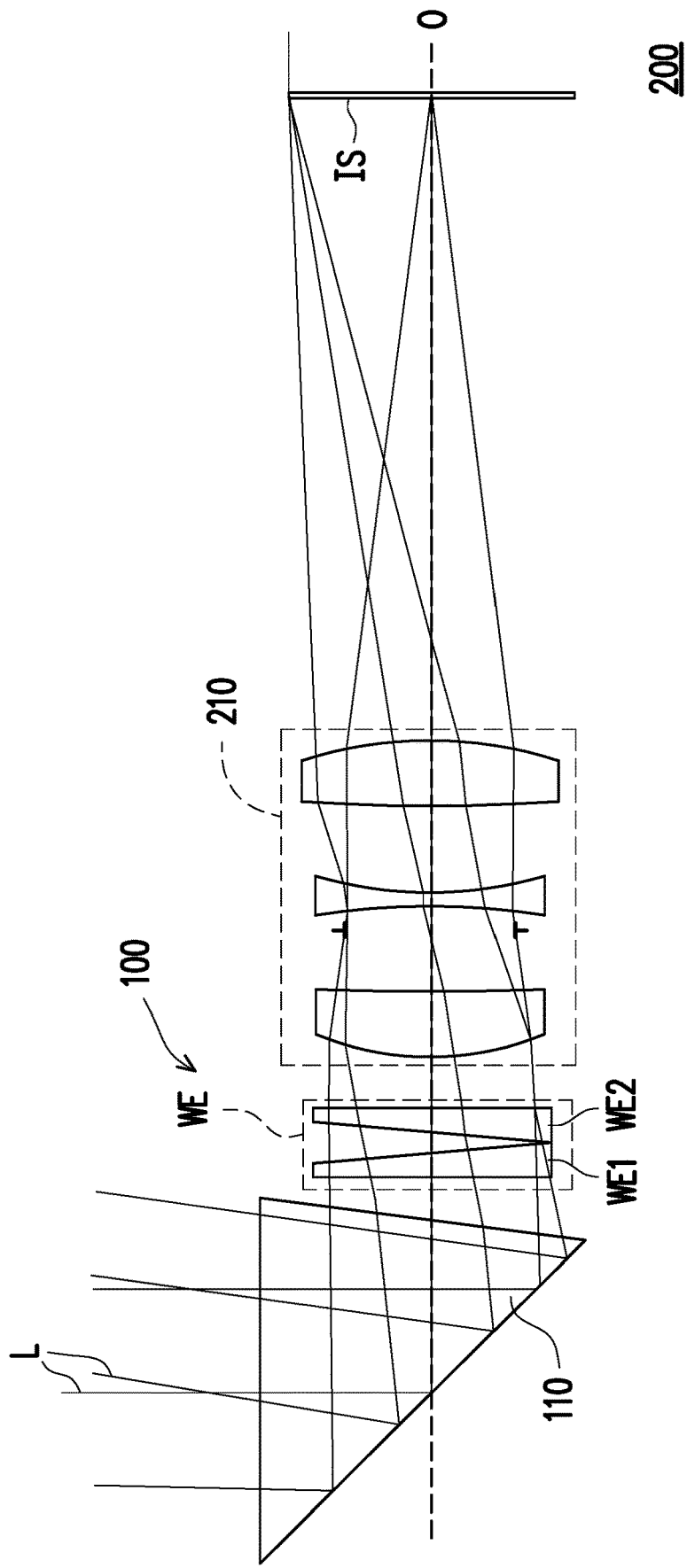
FIG. 2 is a schematic view of an optical path of the imaging module of FIG. 1A.

FIG. 1A is a schematic view of an imaging module according to an embodiment of the disclosure. FIG. 1B is an enlarged schematic view of two wedge-shaped optical elements of FIG. 1A. FIG. 2 is a schematic view of an optical path of the imaging module of FIG. 1A. Referring to FIG. 1A and FIG. 2, an imaging module 200 of this embodiment includes an imaging correction unit 100 and a lens unit 210. The imaging correction unit 100 and the lens unit 210 are arranged along an axis. For example, the axis is an optical axis O. In the embodiment, the lens unit 210 is configured to image a beam L passing through an optical element and two wedge-shaped optical elements WE in a predetermined imaging area of an imaging surface IS. In some embodiments, the optical element may be a lens, a glass, or a prism. In the embodiment, the optical element is an optical turning element 110. The lens unit 210 is configured to image the beam L passing through the optical turning element 110 and the two wedge-shaped optical elements WE in the predetermined imaging area of the imaging surface IS. For example, the beam L may be an image light forming an imaged object, and the imaging surface IS may be a sensing surface of an image sensing element. For example, the image sensing element may include a charge coupled device (CCD), a complementary metal-oxide semiconductor (CMOS) device, or other appropriate type of optical sensing element.

In this embodiment and some other embodiments, the imaging module 200 further includes an actuator such as, but not limited to, a voice coil motor. In detail, the actuator is capable of controlling the two wedge-shaped optical elements WE to rotate relatively. In some embodiments, the relative position of the imaging correction unit 100 and the lens unit 210 may be varied. The beam L may pass through the lens unit 210 in advance and enter the two wedge-shaped optical elements WE.

Specifically, as shown in FIG. 1A, FIG. 1B and FIG. 2, the imaging correction unit 100 has the optical axis O, and includes the optical turning element 110 and the two wedge-shaped optical elements WE. For example, the optical turning element 110 may be a prism, and has a light incident surface S113, a light emitting surface S111, and a reflective optical surface S112. The reflective optical surface S112 is connected to the light incident surface S113 and the light emitting surface S111. The light incident surface S113 is parallel to the optical axis O. The light emitting surface S111 has a first included angle $\theta_p$ with respect to the optical axis O. An included angle between the light emitting surface S111 and the light incident surface S113 is equal to the first included angle $\theta_p$. Moreover, as shown in FIG. 1A and FIG. 2, the beam L is incident on the optical turning element 110 from the light incident surface S113, is reflected by the reflective optical surface S112 and then leaves the optical turning element 110 via the light emitting surface S111. In this way, in the imaging correction unit 100 and the lens unit 210 of the imaging module 200 of the disclosure, by configuring the optical turning element 110, a traveling direction of the image light forming the imaged object can be changed, and optical elements can be configured compactly, thereby reducing the volume.

Figure 3A:
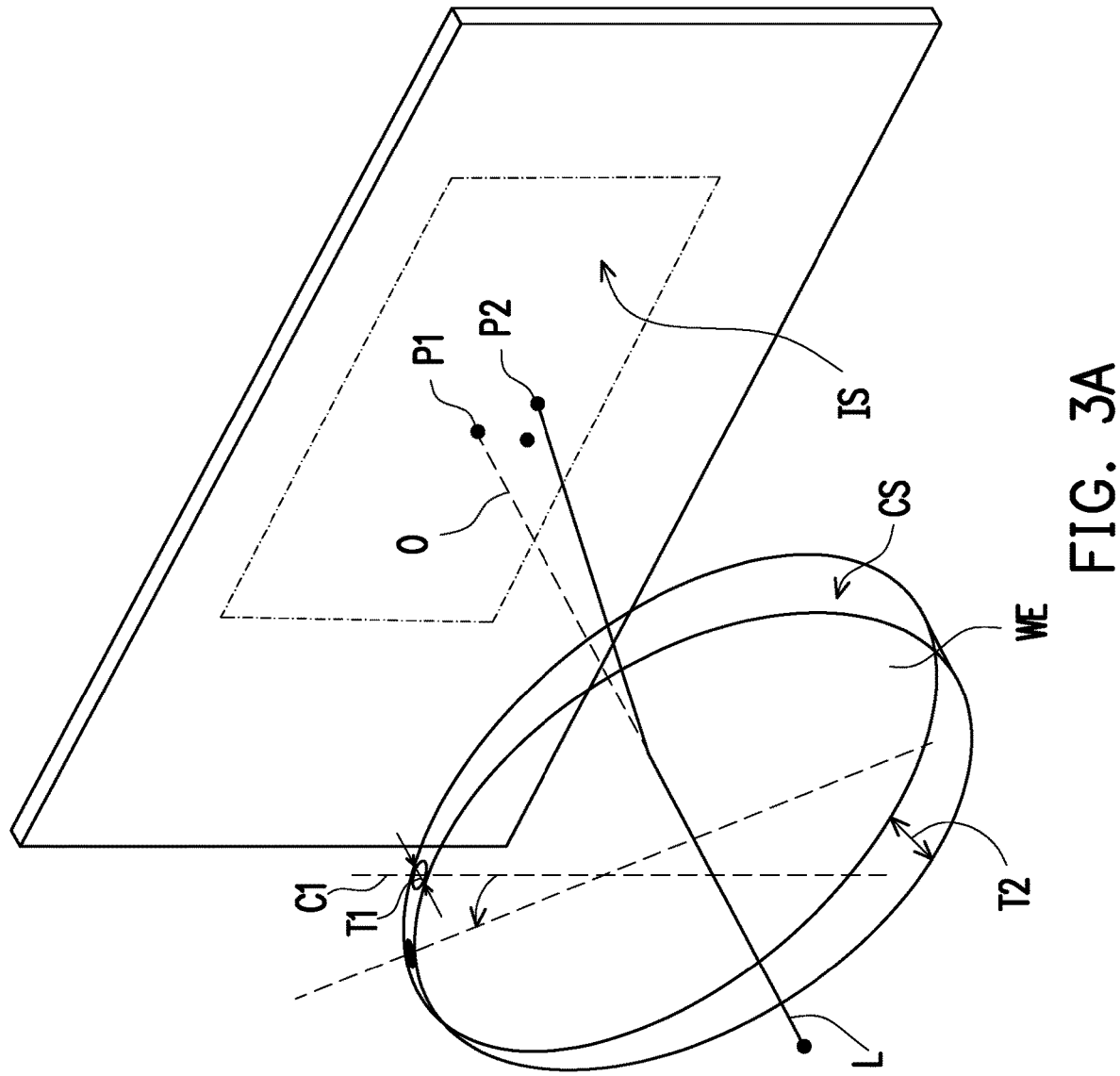
FIG. 3A is a schematic view of an optical path when the wedge-shaped optical elements of FIG. 1A are rotated relative to an optical axis.

In addition, as shown in FIG. 1A and FIG. 1B, each of the wedge-shaped optical elements WE has a minimum thickness dimension T1 and a maximum thickness dimension T2 respectively at a first edge E1 and a second edge E2 opposite the first edge E1. A line connecting the first edge E1 and the second edge E2 forms a symmetry axis C1 of each of the wedge-shaped optical elements WE. A thickness dimension of each of the wedge-shaped optical elements WE gradually changes from the minimum thickness dimension T1 to the maximum thickness dimension T2 along the symmetry axis C1 of each of the wedge-shaped optical elements WE. Moreover, as shown in FIG. 1B and FIG. 3A, each of the wedge-shaped optical elements WE has an inclined optical surface TS, an outer surface OS, and a circumferential end face CS. The outer surface OS and the inclined optical surface TS are opposite each other. The inclined optical surface TS has a second included angle $\theta_w$ with respect to the optical axis O. An included angle between the circumferential end face CS at the second edge E2 and the inclined optical surface TS is equal to the second included angle $\theta_w$.

In detail, as shown in FIG. 1A and FIG. 1B, the two wedge-shaped optical elements WE include a first wedge-shaped optical element WE1 and a second wedge-shaped optical element WE2. The light emitting surface S111 of the optical turning element 110 faces the first wedge-shaped optical element WE1. The outer surface OS of the first wedge-shaped optical element WE1 faces the optical turning element 110. The inclined optical surface TS of the first wedge-shaped optical element WE1 faces the inclined optical surface TS of the second wedge-shaped optical element WE2. The outer surface OS of the second wedge-shaped optical element WE2 faces the lens unit 210. Moreover, both the first wedge-shaped optical element WE1 and the second wedge-shaped optical element WE2 are rotatable relative to the optical axis O, thereby enabling an optical shake compensation of the imaging correction unit 100 and the lens unit 210. A correction process performed during rotation of the wedge-shaped optical elements WE relative to an optical axis is described further below with reference to FIG. 3A.

FIG. 3A is a schematic view of an optical path when the wedge-shaped optical elements WE of FIG. 1A are rotated relative to an optical axis. As shown in FIG. 3A, when the wedge-shaped optical elements WE are rotated an angle relative to the optical axis O, an imaging position of the beam L incident on the imaging surface IS through the wedge-shaped optical elements WE changes from a first position P1 to a second position P2. In detail, in this embodiment, the rotation of the first wedge-shaped optical element WE1 and the second wedge-shaped optical element WE2 relative to the optical axis O can be controlled by the same actuator, and the first wedge-shaped optical element WE1 and the second wedge-shaped optical element WE2 are rotated in opposite directions from each other relative to the optical axis O. For example, as shown in FIG. 2, when the two wedge-shaped optical elements WE are viewed in a direction toward the imaging surface IS, the rotation direction of the first wedge-shaped optical element WE1 is counterclockwise, and the rotation direction of the second wedge-shaped optical element WE2 is clockwise. In this way, in the imaging correction unit 100 and the imaging module 200, by configuring the two wedge-shaped optical elements WE that are rotatable relative to the optical axis O, the relative rotation angles of the two wedge-shaped optical elements WE can be controlled by the same actuator, thereby enabling the optical shake compensation function, thus achieving low power consumption and high efficiency.

In detail, in this embodiment, the imaging correction unit 100 satisfies the following relationship:

$$|2n_p \times \theta_w \times \sin \theta_r| \geq |90 - \theta_p|,$$

in which $n_p$ is a refractive index of the optical turning element 110, $\theta_p$ is the first included angle, $\theta_w$ is the second included angle, and $\theta_r$ is half an angle of the symmetry axis of one of the two wedge-shaped optical elements WE with respect to the symmetry axis of the other of the two wedge-shaped optical elements WE.

Figure 3B:
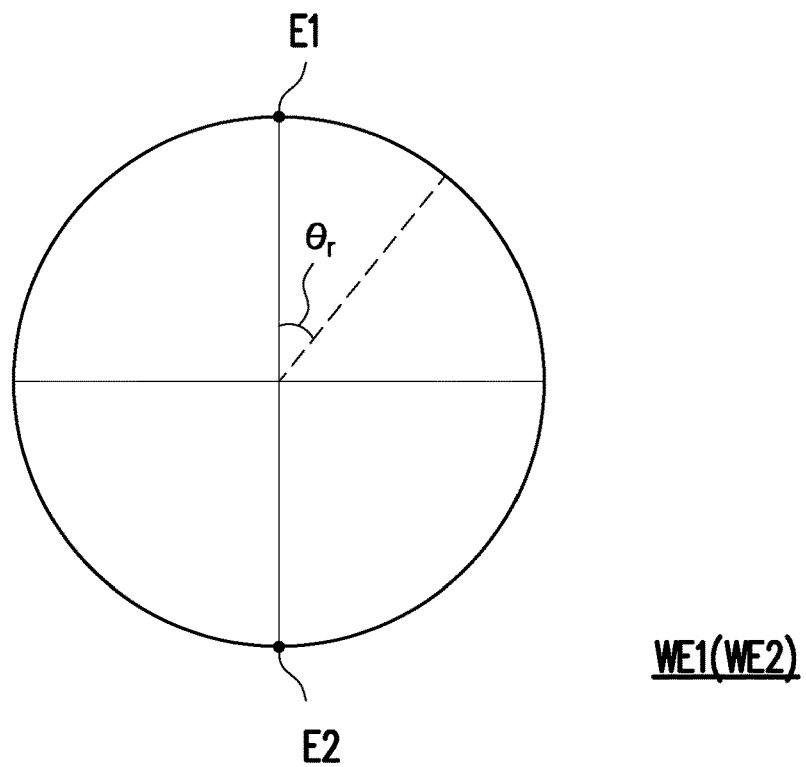
FIG. 3B is a schematic front view of one of the wedge-shaped optical elements of FIG. 1A during rotation.
Figure 3C:
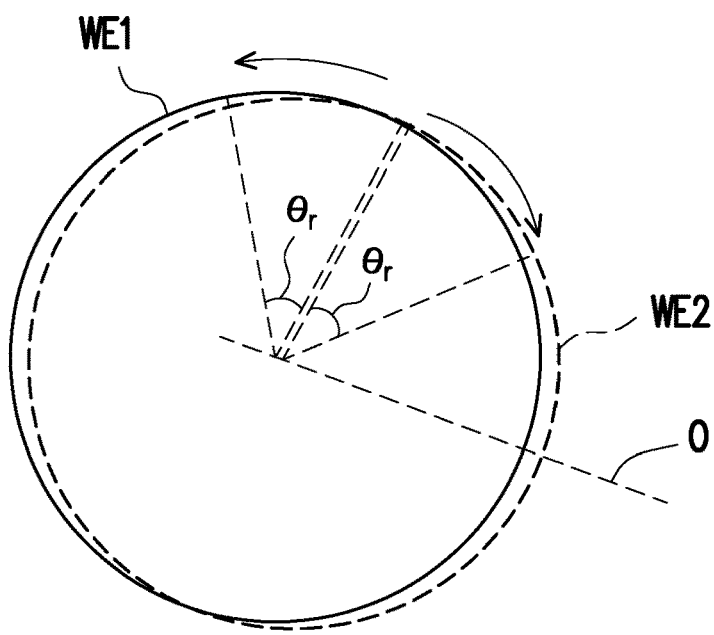
FIG. 3C is a schematic view of rotation directions of the two wedge-shaped optical elements of FIG. 1A during relative rotation.

In detail, referring to FIG. 3B and FIG. 3C, FIG. 3B is a schematic front view of one of the wedge-shaped optical elements of FIG. 1A during rotation, and FIG. 3C is a schematic view of rotation directions of the two wedge-shaped optical elements of FIG. 1A during relative rotation. As shown in FIG. 3B and FIG. 3C, in an initial use state, the center of each wedge-shaped optical element is aligned with the first edge E1 (or the second edge E2) opposite thereto, and then the two wedge-shaped optical elements WE are respectively rotated an angle of $\theta_r$ about their respective centers. In this way, in the imaging correction unit 100 and the imaging module 200, by matching of relative angles of the optical turning element 110, the first wedge-shaped optical element WE1 and the second wedge-shaped optical element WE2, an initial deviation of the beam L passing through the wedge-shaped optical elements WE can be corrected in advance, thus improving the optical shake compensation function of the imaging correction unit 100 and the imaging module 200.

Implementation data of various optical parameters of the imaging correction unit 100 will be mentioned below. However, the data mentioned below is not intended to limit the disclosure. Those of ordinary skill in the art may, after reading the disclosure, make modifications and variations to the parameters or settings herein as appropriate without departing from the scope of the disclosure.

Figure 4:
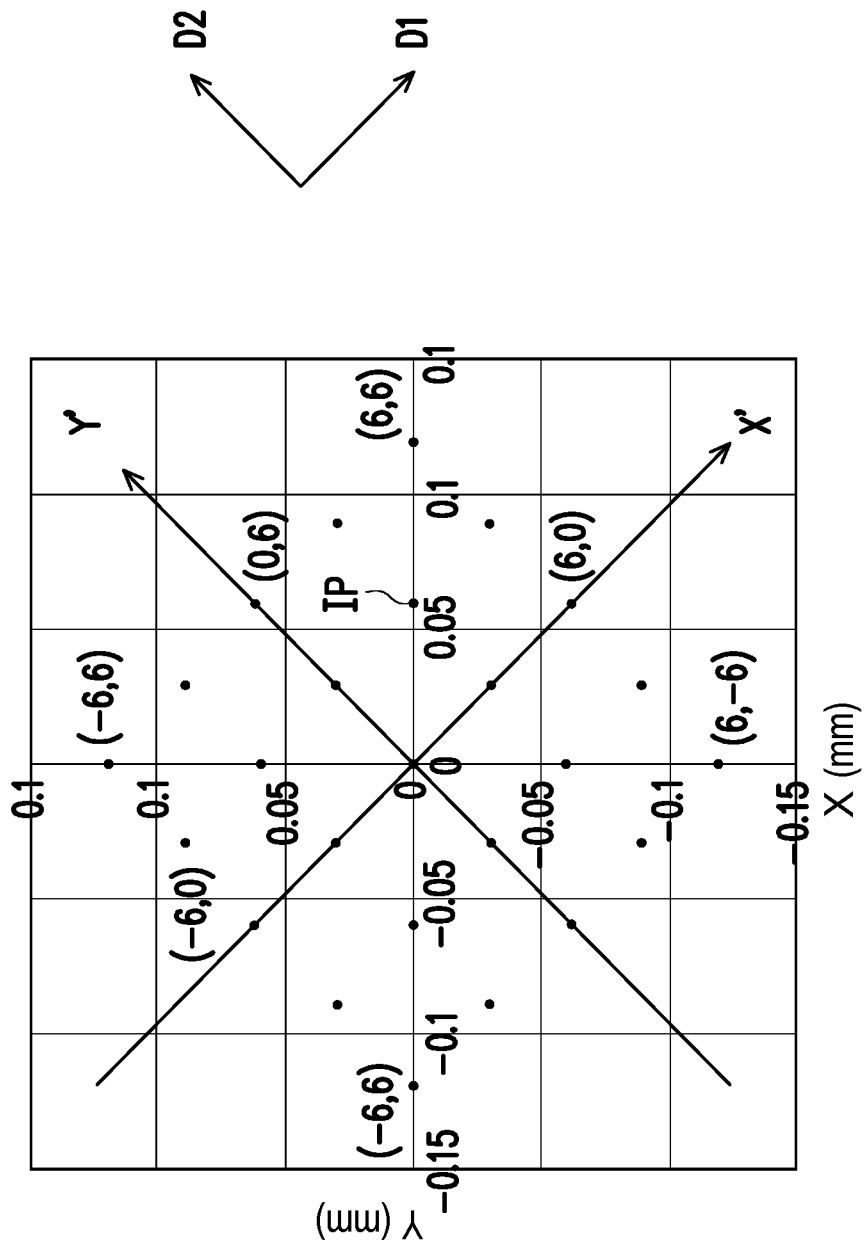
FIG. 4 is a schematic view of a reference correction position on an imaging surface of FIG. 1A.

FIG. 4 is a schematic view of a reference correction position on the imaging surface IS of FIG. 1A. For example, in this embodiment, $n_p$ has a value of 1.6956, $\theta_p$ has a value of 81.6°, $\theta_w$ has a value of 84°, and $\theta_r$ has a value of 45°. As shown in FIG. 4, when the rotation angles of the first wedge-shaped optical element WE1 and the second wedge-shaped optical element WE2 are within a range of ±6°, multiple reference correction positions may be formed. Moreover, these reference correction positions are respectively arranged along a first direction D1 and a second direction D2. Therefore, the first direction D1 and the second direction D2 may be regarded as two dimensions that form a reference coordinate axis, and the two dimensions of the reference coordinate axis correspond to the aforementioned value of $\theta_r$. In detail, on a first reference axis X' of the reference coordinate axis, the actuator only rotates the first wedge-shaped optical element WE1 and does not rotate the second wedge-shaped optical element WE2; on a second reference axis Y' of the reference coordinate axis, the actuator only rotates the second wedge-shaped optical element WE2 and does not rotate the first wedge-shaped optical element WE1. Moreover, in this embodiment, based on the aforementioned implementation data, when the first wedge-shaped optical element WE1 does not rotate, and the second wedge-shaped optical element WE2 is rotated 6°, the imaging position of the beam L incident on the imaging surface IS through the wedge-shaped optical elements WE falls at a position (0.02963, 0.089109) defined by imaging coordinate axes of the imaging surface IS, and this position is 0.083909 mm away from the origin. That is, when the first wedge-shaped optical element WE1 does not rotate and the second wedge-shaped optical element WE2 is rotated 1°, the imaging position of the beam L on the imaging surface IS can be adjusted by 0.013985 mm.

In this way, if it is intended to adjust the imaging position of the beam L that deviates from the origin of the imaging coordinate axes of the imaging surface IS back to the origin, an angle to be rotated by the first wedge-shaped optical element WE1 and the second wedge-shaped optical element WE2 can be determined by related calculations. For example, if an imaging position IP of the beam L that deviates from the origin of the imaging coordinate axes of the imaging surface IS has coordinates (0.059259, 0), according to a slope calculation, the shortest distance between the imaging position IP and the first reference axis X' is 0.041903 mm, and the shortest distance between the imaging position IP and the second reference axis Y' is also 0.041903 mm. Accordingly, by rotating both the first wedge-shaped optical element WE1 and the second wedge-shaped optical element WE2 3°, the imaging position IP of the beam L that deviates from the origin of the imaging coordinate axes of the imaging surface IS can be adjusted back to the origin, thereby enabling the optical shake compensation function.

In further detail, the value of $n_p$ ranges, for example, from 1.52 to 1.85, the value of $\theta_p$ ranges, for example, from 74° to 86.6°, the value of $\theta_w$ ranges, for example, from 80° to 86°, and the value of $\theta_r$ ranges, for example, from 25° to 45°. For example, as shown in the following Table 1, in other embodiments, after appropriate adjustments have been made to the above parameters, the data mentioned in the following examples also make it possible to achieve similar technical effects of imaging correction to those of the imaging correction unit and the imaging module of the disclosure.

TABLE 1

|       | Example 1 | Example 2 | Example 3 | Example 4 | Example 5 |
|-------|-----------|-----------|-----------|-----------|-----------|
| $n_p$ | 1.52      | 1.6       | 1.85      | 1.52      | 1.7       |
| $\theta_p$ | 81.8 | 86.6      | 81        | 74        | 77.5      |
| $\theta_w$ | 83.5 | 86        | 82        | 84        | 80        |
| $\theta_r$ | 40   | 25        | 35        | 30        | 40        |

Figure 5A:
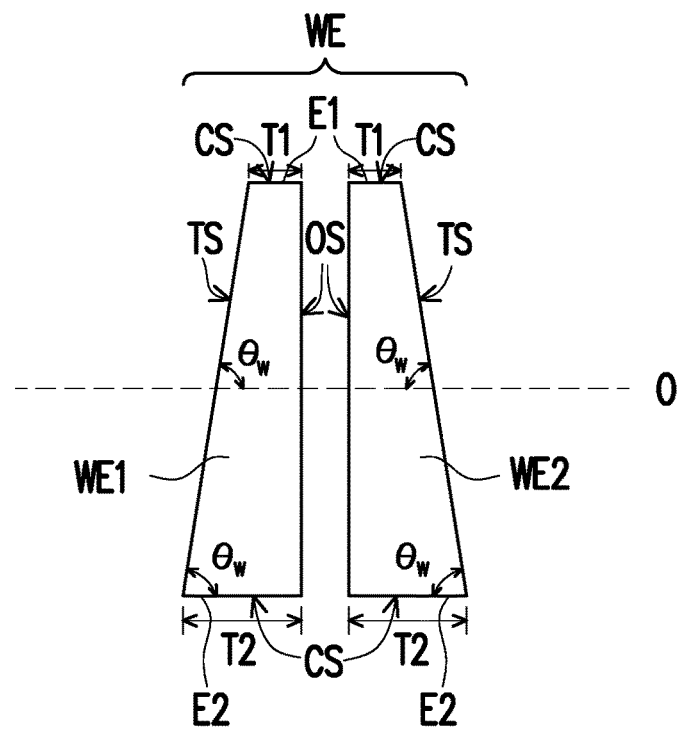
FIG. 5A to FIG. 5C are schematic views of relative arrangements of two wedge-shaped optical elements according to different embodiments of the disclosure.
Figure 5B:
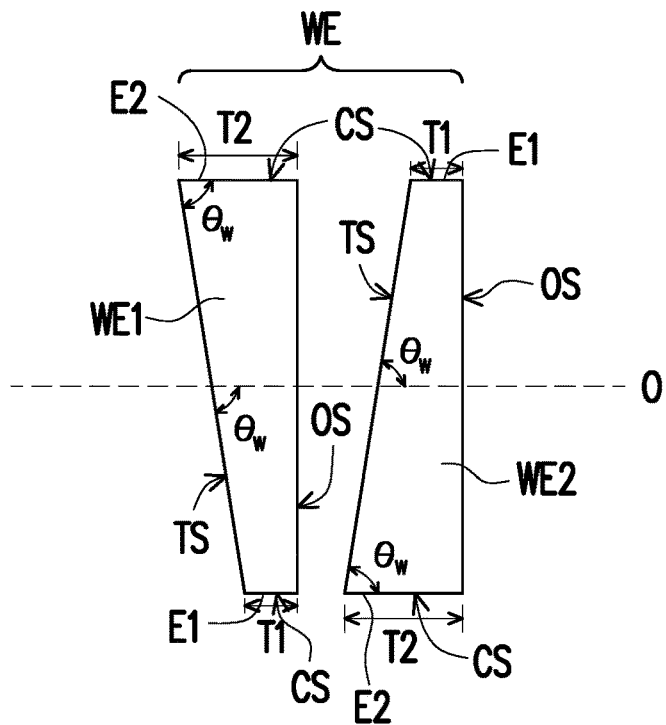
Figure 5C:
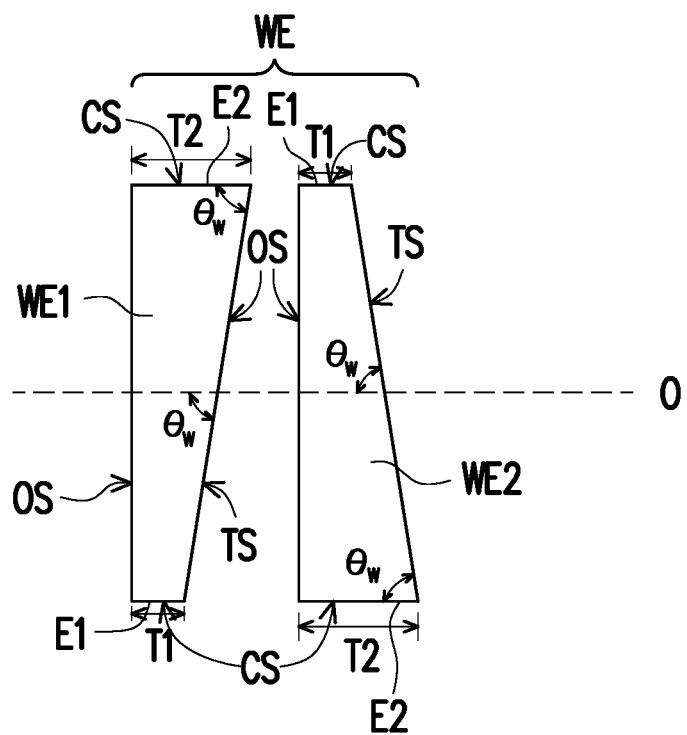

In addition, in the aforementioned embodiments, an example is given in which the inclined optical surface TS of the first wedge-shaped optical element WE1 faces the inclined optical surface TS of the second wedge-shaped optical element WE2. However, the disclosure is not limited thereto. For example, FIG. 5A to FIG. 5C are schematic views of relative arrangements of two wedge-shaped optical elements according to different embodiments of the disclosure. As shown in FIG. 5A to FIG. 5C, in other embodiments, a user may select a suitable combination according to mechanism needs. For example, the inclined optical surface TS of the first wedge-shaped optical element WE1 may face the optical turning element 110 (as shown in FIG. 5A and FIG. 5B), or the inclined optical surface TS of the second wedge-shaped optical element WE2 may face the lens unit 210 (as shown in FIG. 5A and FIG. 5C). In addition, arrangement directions of the first edge E1 and the second edge E2 of the first wedge-shaped optical element WE1 may be opposite from arrangement directions of the first edge E1 and the second edge E2 of the second wedge-shaped optical element WE2 (as shown in FIG. 5B and FIG. 5C). In short, as long as the first wedge-shaped optical element WE1 and the second wedge-shaped optical element WE2 are both rotatable relative to the optical axis O, the optical shake compensation function of the imaging correction unit 100 and the lens unit 210 is enabled, and similar technical effects of imaging correction to those of the imaging correction unit and the imaging module of the disclosure can be achieved.

In summary, in the imaging correction unit and the imaging module of the disclosure, by configuring the optical turning element, a traveling direction of the image light forming the imaged object can be changed. Thus, the imaging correction unit and the imaging module can be reduced in volume. Moreover, in the imaging correction unit and the imaging module, by configuring the two wedge-shaped optical elements that are rotatable relative to the optical axis, relative rotation angles of the two wedge-shaped optical elements can be controlled by the same actuator, thereby enabling the optical shake compensation function, thus achieving low power consumption and high efficiency. In addition, in the imaging correction unit and the imaging module, by configuring the optical turning element, an initial deviation of a beam passing through the wedge-shaped optical element can be corrected in advance, thus improving the optical shake compensation function of the imaging correction unit and the imaging module.

What is claimed is:

1. An imaging correction unit, having an optical axis and comprising:
    an optical element, having a light emitting surface that has a first included angle with respect to the optical axis; and
    two wedge-shaped optical elements, wherein each of the two wedge-shaped optical elements has a minimum thickness dimension and a maximum thickness dimension respectively at a first edge and a second edge opposite the first edge, a line connecting the first edge and the second edge forms a symmetry axis of the each of the two wedge-shaped optical elements, the each of the two wedge-shaped optical elements has an inclined optical surface that has a second included angle with respect to the optical axis, the light emitting surface of the optical element faces one of the two wedge-shaped optical elements, and the two wedge-shaped optical elements are rotatable relative to the optical axis, wherein the imaging correction unit satisfies the following relationship, $$|2n_p \times \theta_w \times \sin\theta_r| \geq |90-\theta_p|,$$

wherein $n_p$ is a refractive index of the optical element, $\theta_p$ is the first included angle, $\theta_w$ is the second included angle, and $\theta_r$ is half an angle of the symmetry axis of one of the two wedge-shaped optical elements with respect to the symmetry axis of the other of the two wedge-shaped optical elements.

2. The imaging correction unit of claim 1, wherein the optical element is an optical turning element.

3. The imaging correction unit of claim 2, wherein the optical turning element is a prism and further has a light incident surface and a reflective optical surface, the reflective optical surface is connected to the light incident surface and the light emitting surface, and the light incident surface is parallel to the optical axis, wherein a beam incident on the optical turning element from the light incident surface is reflected by the reflective optical surface and then leaves the optical turning element via the light emitting surface, and an included angle between the light emitting surface and the light incident surface is equal to the first included angle.

4. The imaging correction unit of claim 3, wherein a thickness dimension of the each of the two wedge-shaped optical elements gradually changes from the minimum thickness dimension to the maximum thickness dimension along the symmetry axis of the each of the two wedge-shaped optical elements.

5. The imaging correction unit of claim 4, wherein the each of the two wedge-shaped optical elements further has an outer surface and a circumferential end face, the outer surface and the inclined optical surface are opposite each other, and an included angle between the circumferential end face at the second edge and the inclined optical surface is equal to the second included angle.

6. The imaging correction unit of claim 1, wherein a thickness dimension of the each of the two wedge-shaped optical elements gradually changes from the minimum thickness dimension to the maximum thickness dimension along the symmetry axis of the each of the two wedge-shaped optical elements.

7. The imaging correction unit of claim 1, wherein the each of the two wedge-shaped optical elements further has an outer surface and a circumferential end face, the outer surface and the inclined optical surface are opposite each other, and an included angle between the circumferential end face at the second edge and the inclined optical surface is equal to the second included angle.

8. The imaging correction unit of claim 1, wherein rotation of the two wedge-shaped optical elements relative to the optical axis is controlled by an actuator.

9. The imaging correction unit of claim 1, wherein the two wedge-shaped optical elements comprise a first wedge-shaped optical element and a second wedge-shaped optical element, and the first wedge-shaped optical element and the second wedge-shaped optical element are rotated in opposite directions from each other relative to the optical axis.

10. An imaging module, comprising:
an imaging correction unit, having an optical axis and comprising:
  an optical element, having a light emitting surface that has a first included angle with respect to the optical axis; and
  two wedge-shaped optical elements, wherein each of the two wedge-shaped optical elements has a minimum thickness dimension and a maximum thickness dimension respectively at a first edge and a second edge opposite the first edge, a line connecting the first edge and the second edge forms a symmetry axis of the each of the two wedge-shaped optical elements, the each of the two wedge-shaped optical elements has an inclined optical surface that has a second included angle with respect to the optical axis, the light emitting surface of the optical element faces one of the two wedge-shaped optical elements, and the two wedge-shaped optical elements are rotatable relative to the optical axis, wherein the imaging correction unit satisfies the following relationship, $|2n_p \times \theta_w \times \sin \theta_r| \geq |90 - \theta_p|$, wherein $n_p$ is a refractive index of the optical element, $\theta_p$ is the first included angle, $\theta_w$ is the second included angle, and $\theta_r$ is half an angle of the symmetry axis of one of the two wedge-shaped optical elements with respect to the symmetry axis of the other of the two wedge-shaped optical elements; and
a lens unit, wherein the imaging correction unit and the lens unit are arranged along the optical axis.

11. The imaging module of claim 10, wherein the lens unit is configured to image a beam passing through the optical element and the two wedge-shaped optical elements in a predetermined imaging area of an imaging surface.

12. The imaging module of claim 11, wherein the optical element is an optical turning element.

13. The imaging module of claim 12, wherein the optical turning element is a prism and further has a light incident surface and a reflective optical surface, the reflective optical surface is connected to the light incident surface and the light emitting surface, and the light incident surface is parallel to the optical axis, wherein the beam is incident on the optical turning element from the light incident surface, is reflected by the reflective optical surface and then leaves the optical turning element via the light emitting surface, and an included angle between the light emitting surface and the light incident surface is equal to the first included angle.

14. The imaging module of claim 13, wherein a thickness dimension of the each of the two wedge-shaped optical elements gradually changes from the minimum thickness dimension to the maximum thickness dimension along the symmetry axis of the each of the two wedge-shaped optical elements.

15. The imaging module of claim 14, wherein the each of the two wedge-shaped optical elements further has an outer surface and a circumferential end face, the outer surface and the inclined optical surface are opposite each other, and an included angle between the circumferential end face at the second edge and the inclined optical surface is equal to the second included angle.

16. The imaging module of claim 10, wherein the optical element is a prism and further has a light incident surface and a reflective optical surface, the reflective optical surface is connected to the light incident surface and the light emitting surface, and the light incident surface is parallel to the optical axis, wherein the beam is incident on the optical element from the light incident surface, is reflected by the reflective optical surface and then leaves the optical element via the light emitting surface, and an included angle between the light emitting surface and the light incident surface is equal to the first included angle.

17. The imaging module of claim 10, wherein a thickness dimension of the each of the two wedge-shaped optical elements gradually changes from the minimum thickness dimension to the maximum thickness dimension along the symmetry axis of the each of the two wedge-shaped optical elements.

18. The imaging module of claim 10, wherein the each of the two wedge-shaped optical elements further has an outer surface and a circumferential end face, the outer surface and the inclined optical surface are opposite each other, and an included angle between the circumferential end face at the second edge and the inclined optical surface is equal to the second included angle.

19. The imaging module of claim 10, further comprising an actuator that controls rotation of the two wedge-shaped optical elements relative to the optical axis.

20. The imaging module of claim 10, wherein the two wedge-shaped optical elements comprise a first wedge-shaped optical element and a second wedge-shaped optical element, and the first wedge-shaped optical element and the second wedge-shaped optical element are rotated in opposite directions from each other relative to the optical axis.

* * * * *